(12) United States Patent
Holt et al.

(10) Patent No.: US 11,313,802 B1
(45) Date of Patent: Apr. 26, 2022

(54) SYSTEM AND METHOD FOR DETECTING CONTAMINANTS IN A SAMPLE FLUID

(71) Applicants: Timothy Michael Holt, Portland, OR (US); Michelle N. Sestak, Parlin, NJ (US)

(72) Inventors: Timothy Michael Holt, Portland, OR (US); Michelle N. Sestak, Parlin, NJ (US)

(73) Assignee: HORIBA INSTRUMENTS, INCORPORATED, Irvine, CA (US)

(*) Notice: Subject to any disclaimer, the term of this patent is extended or adjusted under 35 U.S.C. 154(b) by 0 days.

(21) Appl. No.: 17/554,841

(22) Filed: Dec. 17, 2021

Related U.S. Application Data (60) Provisional application No. 63/236,445, filed on Aug. 24, 2021.

(51) Int. Cl.
*G01N 21/65* (2006.01)
*G01N 21/05* (2006.01)
*G01J 3/44* (2006.01)

(52) U.S. Cl.
CPC .......... *G01N 21/658* (2013.01); *G01J 3/4412* (2013.01); *G01N 21/05* (2013.01)

(58) Field of Classification Search
CPC .............................. G01N 21/658; G01J 3/4412
See application file for complete search history.

(56) References Cited

U.S. PATENT DOCUMENTS

| 10,828,637 | B2* | 11/2020 | Barcelo | G01N 21/6428 |
| 2008/0309918 | A1* | 12/2008 | Guo | G01N 21/65 |
| | | | | 977/762 |
| 2012/0327408 | A1* | 12/2012 | Guo | G01J 3/44 |
| | | | | 356/301 |
| 2020/0256800 | A1* | 8/2020 | Barcelo | B82Y 30/00 |

FOREIGN PATENT DOCUMENTS

| CN | 106238109 A | * 12/2016 |
| CN | 212083231 U | * 12/2020 |

OTHER PUBLICATIONS

Kai Pang, "A Performance-Enhanced Bimetallic Chip for the Detection of Cadmium Ions with Surface Plasmon Resonance", Springer Science+Business Media New York 2015 (Year: 2015).*

* cited by examiner

*Primary Examiner* — Maurice C Smith
(74) *Attorney, Agent, or Firm* — Manuel de la Cerra (57) ABSTRACT

Disclosed is a system for detecting contaminants in a sample fluid. The system has a colloidal dispersion circuit with a reservoir containing a colloidal dispersion with colloidal particles capable of exhibiting localized surface plasmon resonance ("LSPR particles"), a Raman spectrometer/flow cell and a pump for circulating the colloidal dispersion through the colloidal dispersion circuit. A colloidal dispersion level sensor measures the extent of colloidal dispersion in the colloidal dispersion circuit. A permeation valve diverts the colloidal dispersion in the colloidal dispersion circuit through an ultra-filtration membrane with a pore size smaller than the LSPR particles, thus preventing the LSPR (Continued)

particles from passing through. The sample may be introduced into the colloidal dispersion circuit through a fluid sample injection valve. A processor is connected to the Raman spectrometer/flow cell, the pump, the permeation valve, the colloidal dispersion level sensor, and the fluid sample injection port. The processor performs several steps to analyze the sample.

12 Claims, 9 Drawing Sheets

FIG. 1

FIG. 2
(Starting Configuration)

FIG. 3
(Reaching Predetermined Concentration Configuration)

FIG. 4
(Predetermined Concentration Configuration)

FIG. 5
(Non-Steady State Analysis Configuration)

FIG. 6
(Steady State Analysis Configuration When In-Line)

FIG. 7
(Reaching Predetermined Fluid Level)

FIG. 8
(Cleaning Configuration)

FIG. 9

SYSTEM AND METHOD FOR DETECTING CONTAMINANTS IN A SAMPLE FLUID

RELATED APPLICATIONS

This application claims priority to U.S. Provisional application 63/236,445 filed on Aug. 24, 2021, the entire contents of which are incorporated herein by reference.

FIELD OF THE INVENTION

This invention relates to systems and methods for detecting contaminants in fluids.

BACKGROUND

Many industries require very high purity chemicals. Liquid chemicals requiring parts per billion (ppb) or lower detection limits use state-of-the-art analytical techniques such as Inductively Coupled Plasma with Mass Spectrometer (ICP-MS) or Inductively Coupled Plasma with Optical Emission Spectrometer (ICP-OES), Chromatographic techniques such as High-Pressure Liquid Chromatography (HPLC), Headspace Gas Chromatography (headspace GC) and similar advanced analytical methods. These often require significant sample preparation to complete the analysis. Many industries need to measure the liquid chemicals in process, in-line or in-situ. Examples include, but are not limited to: chemical manufacturing systems, chemical blending systems, chemical distribution systems, chemical containers, and processing tools that use such chemicals in a separate process. Processing tools that utilize liquid chemicals may include, but are not limited to: cleaning, etching, spraying, coating, semiconductor processing, polishing, etc. Biotechnology and pharmacology applications may also require ultra-high purity chemicals both in-line and in-situ. Many advanced analytical techniques are either very expensive to sample and measure in-line, or very large and impractical to establish on a chemical process. So there is a need for a small in-process, in-line and/or in-situ chemical monitoring system capable of detecting and identifying chemicals and impurities at or below ppm levels.

Enhanced Raman spectroscopy methods such as Surface Enhanced Raman Spectroscopy (SERS), Resonant Raman Spectroscopy, Surface Enhanced Resonance Raman Spectroscopy (SERRS), and similar analytical techniques are capable of detecting the concentration levels of chemicals and impurities required as well as the ability to identify the chemical nature of the chemicals and impurities. Herein we disclose a device that is capable of in-line, in-process, and in-situ chemical analysis that utilizes Raman resonance to spectrally detect and identify impurities and low concentration chemicals in liquid chemical processing. The device can also function as an off-line analytical tool.

SUMMARY

Disclosed is a system that effectively detects contaminants in a sample fluid. The system has a colloidal dispersion circuit with a reservoir containing a colloidal dispersion with colloidal particles capable of exhibiting localized surface plasmon resonance ("LSPR particles"), a Raman spectrometer/flow cell and a pump for circulating the colloidal dispersion through the colloidal dispersion circuit. A colloidal dispersion level sensor measures the extent of colloidal dispersion in the colloidal dispersion circuit. A permeation valve diverts the colloidal dispersion in the colloidal dispersion circuit through an ultra-filtration membrane with a pore size smaller than the LSPR particles, thus preventing the LSPR particles from passing through. The sample may be introduced into the colloidal dispersion circuit through a fluid sample injection valve. A processor is connected to the Raman spectrometer/flow cell, the pump, the permeation valve, the colloidal dispersion level sensor, and the fluid sample injection port. The processor performs the following steps: (a) activate the pump; (b) read a first signal from the Raman spectrometer/flow cell, wherein the signal is based on the Raman scattering; (c) open the permeation valve to divert the colloidal dispersion to the ultra-filtration membrane to reach a predetermined colloidal dispersion level, as indicated by the colloidal dispersion level sensor; (d) open the fluid sample injection valve to thereby introduce the sample fluid into the colloidal dispersion circuit; (e) read a second signal from the Raman spectrometer/flow cell, wherein the second signal is based on the Raman scattering; and (f) based on the first signal and second signal, determine the presence of contaminants in the sample fluid.

The colloidal dispersion circuit may also include a reservoir valve between the reservoir and the Raman spectrometer/flow cell. The reservoir valve may be connected to the processor such that the processor can open the reservoir valve during step (b). After step (c) the processor may regulate the permeation valve to maintain the predetermined colloidal dispersion level.

The system may also have a cleaning valve that introduces a cleaning solution from a cleaning solution reservoir to the colloidal dispersion circuit. The cleaning valve may be connected to the processor. The processor may further close the fluid sample injection valve, open the permeation valve, and open the cleaning valve.

The system may include a database connected to the processors. The database includes data that relates a plurality of spectra to a plurality of contaminants, and the processor may access the database to identify the type of contaminant based on the database data. The processor may also identify the quantity of the contaminant based on the strength of the second signal.

A method of detecting contaminants in a sample is also disclosed. The method includes the steps of: (a) introducing a colloidal dispersion comprised of a liquid and colloidal localized surface plasmon resonance ("LSPR") particles; (b) exposing the colloidal dispersion with electromagnetic radiation sufficient to induce Surface enhanced Raman scattering in the colloidal dispersion of LSPR particles; (c) measuring the scattered electromagnetic radiation from step (b); (d) introducing the sample to the colloidal dispersion; (e) exposing the sample/colloidal dispersion mixture with electromagnetic radiation sufficient to induce Surface enhanced Raman scattering in the colloidal dispersion LSPR particles; (f) measuring the scattered electromagnetic radiation from step (e); (g) determining the presence of contaminants in the sample by comparing the measurement from step (c) to step (f).

The method may further, after step (a), concentrate the LSPR particles by permeating liquid from the colloidal dispersion.

The method may also include the steps of: after step (a), concentrate the LSPR particles to a predetermined colloidal dispersion level by permeating only the liquid from the colloidal dispersion; and during steps (d), (e) and (f), permeate the sample/colloidal dispersion mixture to maintain the predetermined colloidal dispersion level.

The method may also include the steps of: comparing the measurements from steps (c) and (f) to a database that comprises data that relates a plurality of spectra to a plurality of contaminants; and identifying the type of contaminant based on the comparison in step (h).

The method may include the step of identifying the concentration or quantity of the contaminant based on the strength of the measurement in step (f).

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents, as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated, connection does not necessarily mean a direct, unimpeded connection, unless otherwise noted.

The following list of example features corresponds to the attached figures and is provided for ease of reference, where like reference numerals designate corresponding features throughout the specification and figures:

Fluid Contaminant Detection System 5
Colloidal Dispersion Circuit 7
Pump 8
Reservoir 10
Colloidal Dispersion Level Sensor 12
Raman Spectrometer/Flow Cell 15
Ultra-Filtration Membrane 20
Permeated Liquid 22
Permeated Liquid Reservoir 25
Fluid Sample 30
Colloidal Localized Surface Plasmon Resonance ("LSPR") Particles 35
Processor 37
Ultra-Filtration Membrane Permeation Valve 45
Permeation Fluid Path 50
Reservoir Valve 55
Fluid Sample Valve/Injection Port 60
Fluid Sample Injection Path 65
Cleaning Solution Reservoir 70
Cleaning Valve 75
A Method of Detecting Contaminants in Sample 900
Steps in the Method 900 905-970

Raman Spectroscopy is a non-destructive chemical analysis technique that provides detailed information about chemical structure, phase and polymorphy, crystallinity and molecular interactions. It is based upon the interaction of light with the chemical bonds within a material. Raman is a light scattering technique whereby a molecule scatters incident light from a high intensity laser light source. Most of the scattered light is at the same wavelength (or color) as the laser source and does not provide useful information—this is called Rayleigh Scatter. However, a small amount of light (typically 0.0000001%) is scattered at different wavelengths (or colors), which depend on the chemical structure of the analyte—this is called Raman Scatter.

A Raman spectrum features a number of peaks, showing the intensity and wavelength position of the Raman scattered light. Each peak corresponds to a specific molecular bond vibration, including individual bonds such as C—C, C=C, N—O, C—H etc., and groups of bonds such as benzene ring breathing mode, polymer chain vibrations, lattice modes, etc.

A localized surface plasmon (LSP) is formed in a nanoparticle of size comparable to or smaller than the excitation wavelength because of the confinement of a surface plasmon. When a conductive nanoparticle or similar nano-scale structure such as gold or silver is excited by light, the oscillating electric field causes the conduction electrons to oscillate coherently. This coherence magnifies, locally, the visible light by orders of magnitude.

A plasmon is a discreet measurement unit (like a photon) of electron oscillations on a conductive material. When light interacts with an appropriate material, oscillations of electrons in the conduction bands produce surface plasmon. For nanoparticles smaller than the incident frequency of the light, the plasmon is restricted to the surface of the nanoparticle, termed local surface plasmon. When the frequency of the light matches the natural resonant frequency of the nanoparticle, local surface plasmon resonance will occur at the surface of the nanoparticle. The localized surface plasmon resonance ("LSPR") results in a very intense electromagnetic signal at the surface. The resonance frequency and intense electromagnetic field can be used to detect and characterize molecules that are at or near the particle's surface. Surface Enhanced Raman Spectroscopy utilizes these effects to characterize very low molecular concentration at or near the nanoparticles' surfaces.

LSPR nano structures include but are not limited to: metal nanoparticles, metal alloy nanoparticles, doped and undoped semiconductor nanoparticles, metal oxide nanoparticles, and composites of these types of materials, typically 3-1000 nm in size coated or layered particles that contain an element capable of LSPR, nanoparticles that have a structure to improve their resonance, nano-shells, nano-bars, nano-wires, nano-clusters, nano-stars, aggregate nanoparticles, cocoon shaped nanoparticles, nano-sheets, and similar shapes and structures that can improve or modulate the resonant properties of the material.

The contaminant detection system disclosed herein introduces the colloidal LSPR particles, typically nano-scale structures (such as gold or silver) dispersed in a liquid, to flow through a permeating ultra-filtration membrane that is selected based on the size and properties of the LSPR particles. Circulation through the permeating membrane concentrates the LSPR material by removing only the liquid and dissolved materials that are small enough to pass through the filter membrane, thus allowing the LSPR nano-scale structures to increase in concentration, as they are retained in the colloidal dispersion circuit. As the LSPR particles concentrate, the nano-scaled structures get closer together in the liquid. Once an optimal concentration of LSPR material is reached, the Raman signal may be measured using the Raman Spectrometer/flow cell using a laser to excite the nano-structures to a resonant state. Thus, the interrogated volume of the Raman Spectrometer/flow cell measures the (SERS) Surface Enhances Raman spectrum, resonant Raman spectrum, and/or (SERRS) Surface Enhanced Resonant Raman spectrum. SERS, SERRS and resonant Raman spectroscopy all create significant increases in the Raman scattering of materials within the interrogated volume, allowing the spectrometer to improve detection limits by up to many orders of magnitude. In effect, the enhanced resonance of the LSPR nano-particles acts like a spotlight to illuminate adjacent and adsorbed contaminants that would otherwise not be detected or seen in conventional techniques. Once the optimal concentration of LSPR particles is achieved, sampling can be run in-line by optimizing the permeation rate of the ultra-filtration membrane with the input of sample. Or the sample can be injected into the colloidal dispersion circuit path of the device for off-line measurements.

Figure 1:
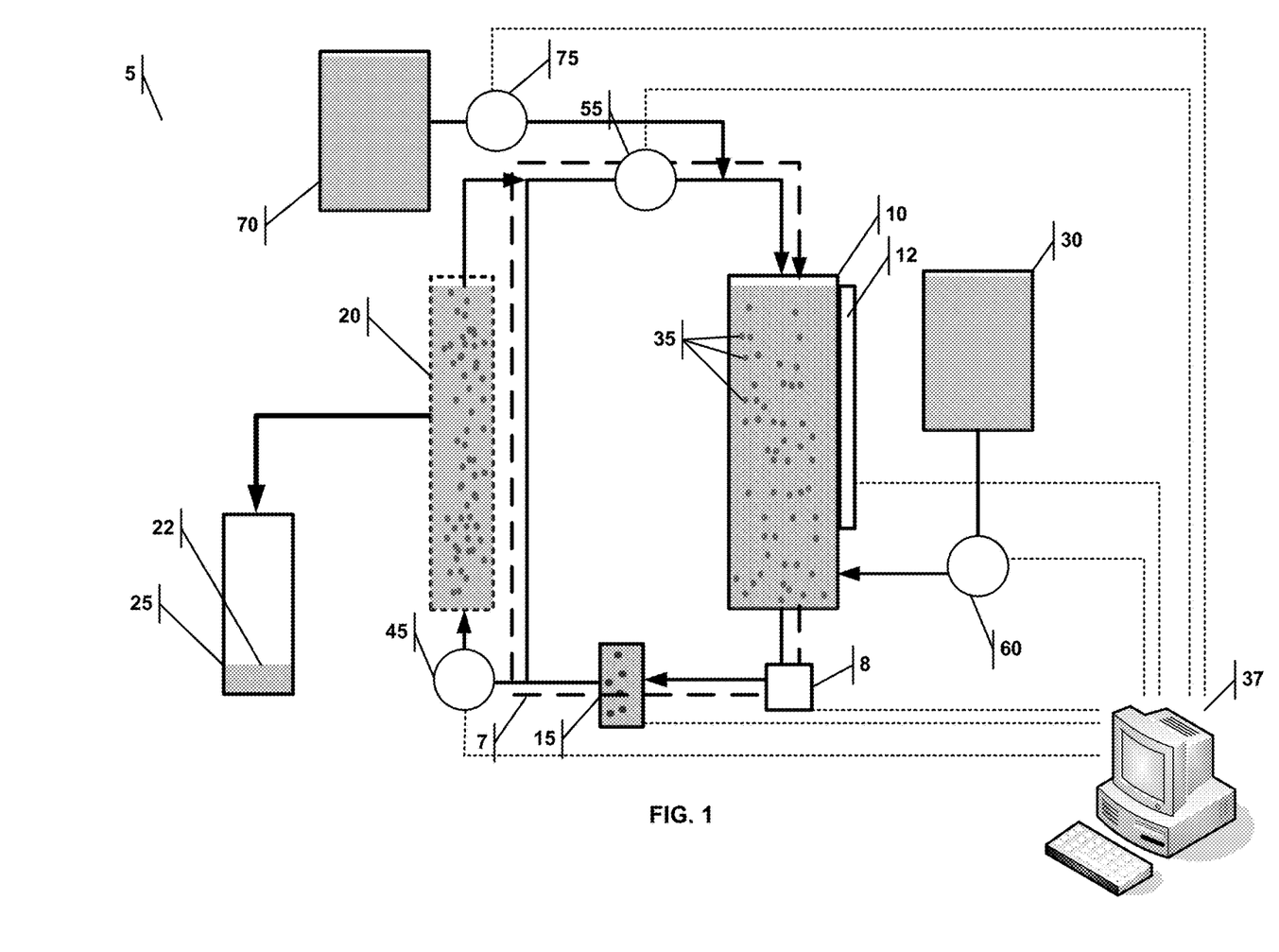
FIG. 1 illustrates a system for detecting contaminants in a sample fluid.

Turning now to FIG. 1, the fluid contaminant detection system 5 of the present invention comprises a colloidal dispersion circuit 7, a colloidal dispersion level sensor 12, a permeation valve 45, a fluid sample injection valve 60 configured to introduce the fluid sample 30 into the colloidal dispersion circuit 7, and a processor 37. The colloidal dispersion circuit 7 itself comprises a reservoir 10 that holds or contains a colloidal dispersion with colloidal localized surface plasmon resonance (hereinafter LSPR) particles 35, a Raman spectrometer or flow cell 15, and a pump 8 for circulating the colloidal dispersion. The permeation valve 45 is constructed to divert the colloidal dispersion in the colloidal dispersion circuit 7 through an ultra-filtration membrane 20. The ultra-filtration membrane 20 has a pore size smaller than the LSPR particles 35, thus preventing the LSPR particles 35 from passing through. The liquid in the reservoir 10 that contains the LSPR particles 35 forming a colloidal dispersion that can then be filtered with the ultra-filtration membrane 20, so that a permeated liquid 22 can be filtered out of circulation into the permeated liquid reservoir 25, thereby adjusting the concentration of the LSPR particles 35 in the reservoir 10 to the level desired by the fluid contaminant detection system 5. The processor 37 reads the signal from the colloidal dispersion level sensor 12 to determine the extent of colloidal dispersion in the colloidal dispersion circuit 7; note that, while the colloidal dispersion level sensor 12 is illustrated in FIG. 1 as being placed at or near the reservoir 10, it can be placed at other locations along the colloidal dispersion circuit 7 without affecting the functionality, and without departing from the scope of the present invention. The fluid contaminant detection system 5 may optionally include a reservoir valve 55 in the colloidal dispersion circuit 7 to better regulate the flow of the circulating fluid containing the colloidal dispersion back into the reservoir 10. The colloidal dispersion circuit 7, represented in FIG. 1 by the dashed lines, refers to the path of the circulated fluid that flows from the reservoir 10 through a pump 8 to the Raman spectrometer or flow cell 15, through a reservoir valve 55, and back into the reservoir 10. When the ultra-filtration membrane permeation valve 45 is opened, some of the circulated fluid may also flow through the valve 45 and ultra-filtration membrane 20 to the reservoir valve 55 and the reservoir 10, and this path is also included as part of the colloidal dispersion circuit 7, when the permeated valve 45 is in an open position. Optionally, the system 5 may include a cleaning valve 75 that introduces a cleaning solution from a cleaning solution reservoir 70 into the colloidal dispersion circuit 7, after the analysis of the fluid sample 30 is complete.

The processor 37 of the fluid contaminant detection system 5 is connected to the pump 8, the Raman spectrometer/flow cell 15, the permeation valve 45, the colloidal dispersion level sensor 12, and the fluid sample injection port 60. The processor 37 is configured to perform the following steps: (a) activate the pump 8; (b) read a first signal from the Raman spectrometer/flow cell 15, wherein the signal is based on the Raman scattering; (c) open the permeation valve 45 to divert the colloidal dispersion to the ultra-filtration membrane 20 to reach a predetermined colloidal dispersion level, as indicated by the colloidal dispersion level sensor 12; (d) open the fluid sample injection valve 60 to thereby introduce the fluid sample 30 into the colloidal dispersion circuit 7; (e) read a second signal from the Raman spectrometer/flow cell 15, wherein the second signal is based on Raman scattering; and (f) based on the first signal obtained in step (b) and the second signal obtained in step (e), determine the presence of contaminants in the fluid sample 30. If, as illustrated in FIG. 1, the system 5 includes the optional reservoir valve 55, that reservoir valve 55 is connected between the reservoir 10 and the Raman spectrometer or flow cell 15, and the processor 37 is further configured to open the reservoir valve 55 during step (b), when it reads the Raman scattering signal from the Raman spectrometer/flow cell 15.

Figure 2:
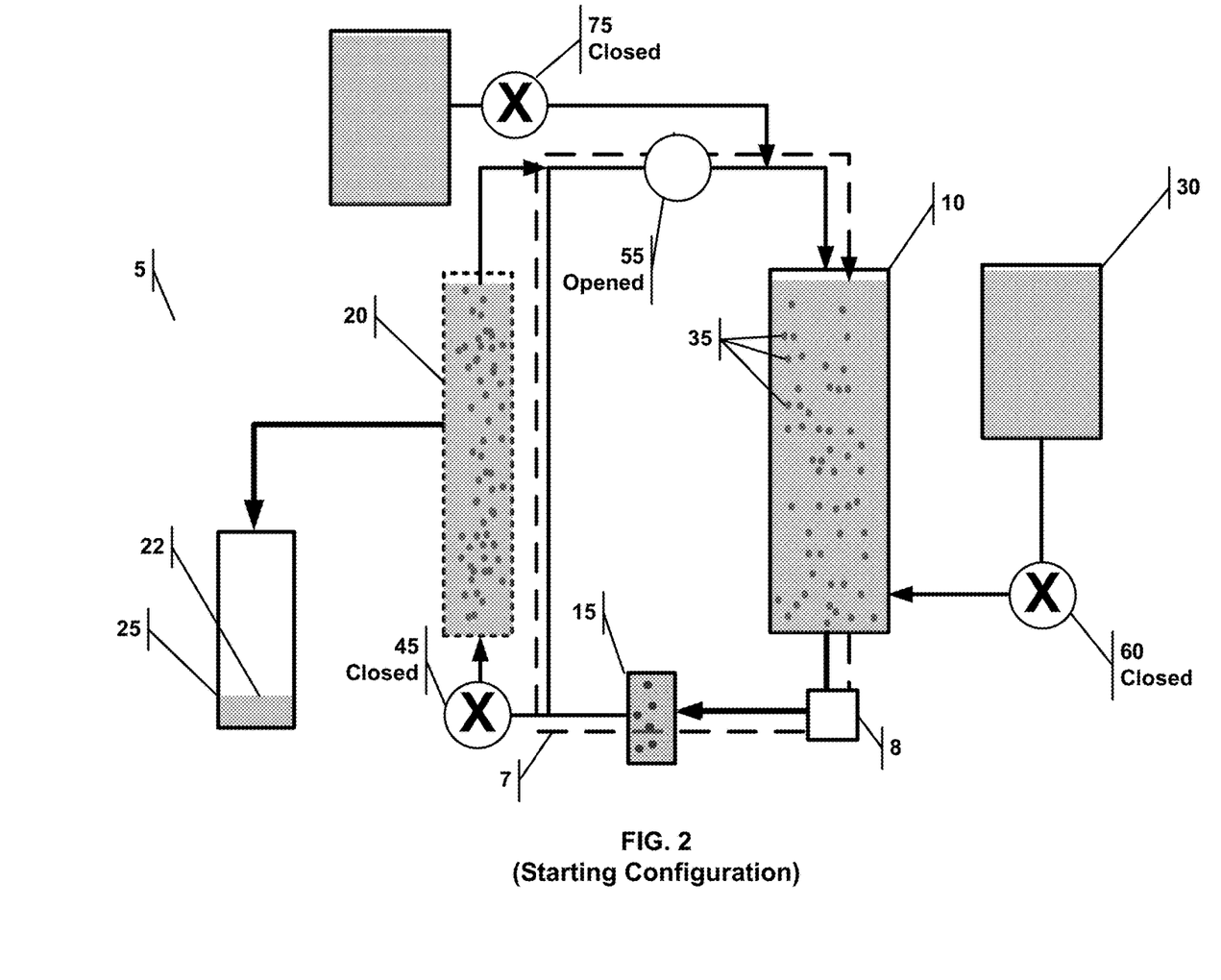
FIG. 2 is the starting configuration of the system.

Referring now to FIG. 2, the system 5 is shown in the starting configuration, when the reservoir 10 is full of a liquid containing the LSPR particles 35 (i.e., the colloidal dispersion), and the fluid sample 30 has not yet been introduced into the colloidal dispersion circuit 7 through the fluid sample valve or injection port 60. Both the fluid sample valve/injection port 60 and the permeation valve 45 are closed. To achieve ideal resonance for detecting minute quantities or concentrations of contaminants in the sample liquid 30, the system 5 is operated to adjust the distance between LSPR particles by permeating the colloidal dispersion to remove the permeated liquid 22 from the circuit 7, which increases the concentration of the colloidal dispersion's LSPR particles 35, adjusting to optimize signal intensity. The processor 37 may take a reading from the Raman spectrometer/flow cell 15 to determine whether optimal concentration has been achieved. Further, depending on the type and concentration of the expected contaminates in the fluid sample, the optimal concentration of LSPR particles in the colloidal dispersion may vary.

Figure 3:
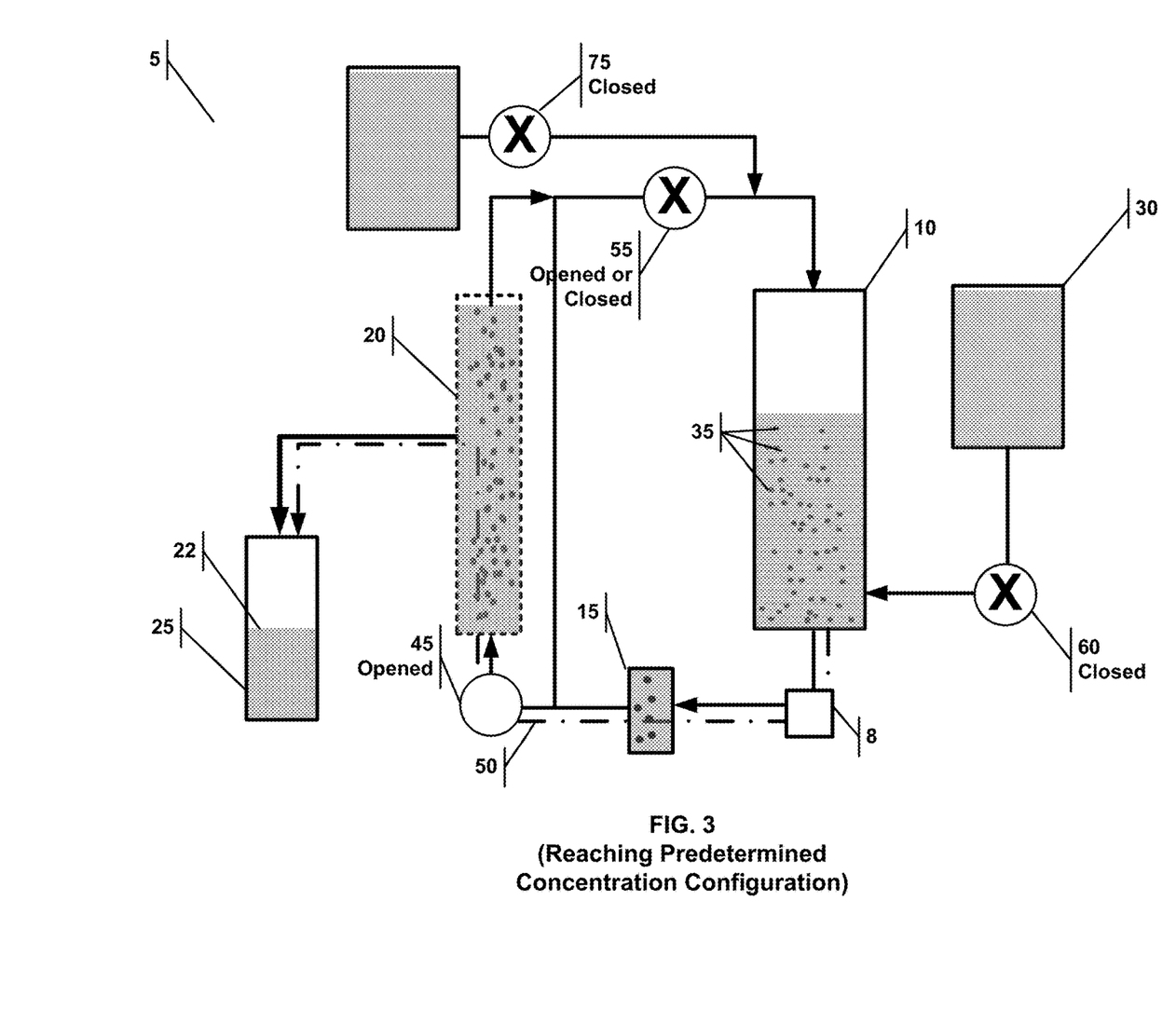
FIG. 3 is the configuration where the system is reaching the predetermined colloidal dispersion level.

FIG. 3 shows the system state in a configuration wherein the fluid contamination detection system 5 is reaching the predetermined concentration desired, so that the system 5 can read a baseline signal at optimal resonance before the fluid sample 30 is introduced. The ultra-filtration permeation membrane valve 45 is opened, and thus the liquid in the colloidal dispersion is passed through an ultra-filtration membrane 20. Since the membrane 20 has pore sizes smaller than the LSPR particles 35, the permeated liquid 22 that passes through the membrane 20 and enters the permeated liquid reservoir 25 does not contain any significant amount of LSPR particles 35. The optional reservoir valve 55 may be opened or closed to assist in this process, which is performed for the purpose of achieving optimal resonance and getting a baseline reading for Raman scattering. Optimal concentration may be detected from the Raman spectrometer/flow cell 15, or it can be detected by the colloidal dispersion level sensor 12, either in conjunction with information from a database accessed by the processor 37, or without using information from a database.

Figure 4:
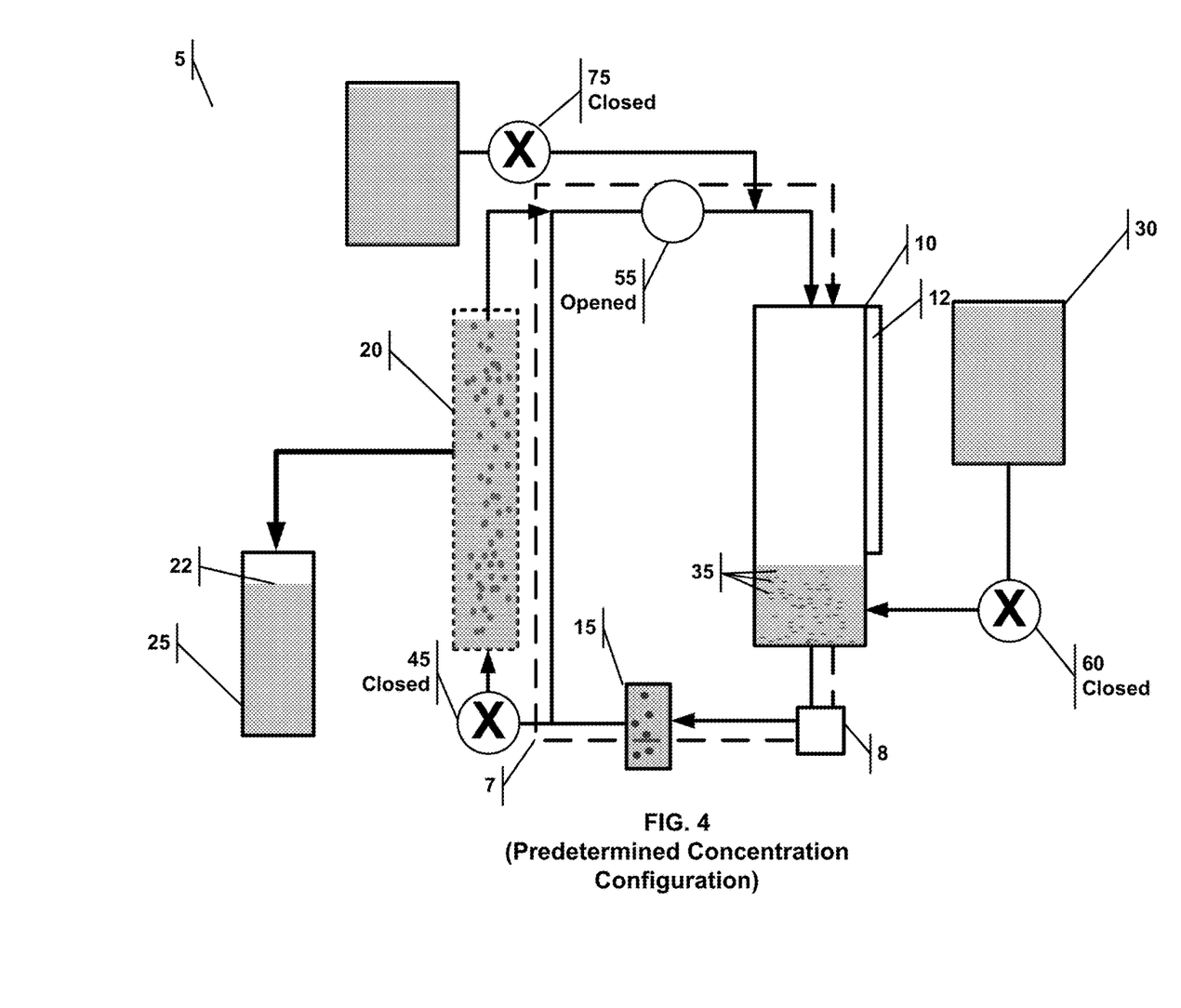
FIG. 4 is the configuration where the system has reached the predetermined colloidal dispersion level.

FIG. 4 shows the fluid contamination detection system 5 as it reaches the predetermined concentration desired. This can be indicated by the colloidal dispersion level sensor 12. Once the predetermined colloidal dispersion has been reached, the ultra-filtration membrane permeation valve 45 is turned off, so that the valve 45 is now closed. In other words, FIG. 4 shows the system state that is triggered when the concentration of the colloidal dispersion (and thus the concentration of the LSPR particles 35) is at an optimal level to achieve optimal signal intensity in the reading from the Raman flow cell 15.

Thus, FIG. 3 illustrates step (c) performed by the processor 37 discussed previously—i.e., opening the permeation valve 45 to divert the colloidal dispersion to the ultra-filtration membrane 20 to reach a predetermined colloidal dispersion level, as indicated by the colloidal dispersion level sensor 12. FIG. 4 illustrates the system upon the completion of step (c). It should be noted that although step (b) should be performed at least once prior to the introduction of the fluid sample 30 into the system 5, it may be performed more than once or iteratively throughout step (c) as well. Thus, the system 5 may have one or more baseline readings from the Raman spectrometer/flow cell 15 before the sample 30 is introduced for analysis.

Figure 5:
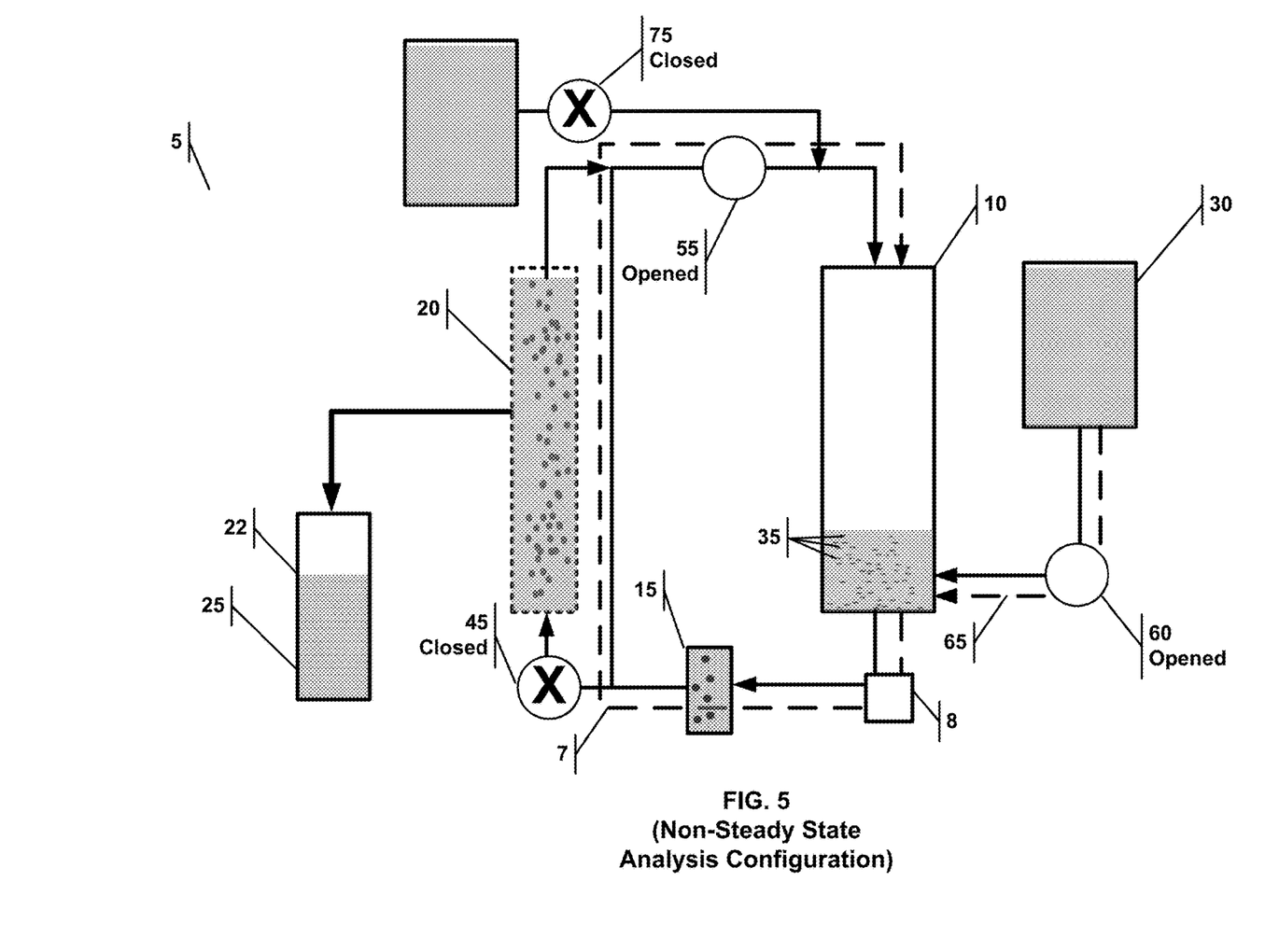
FIG. 5 is a non-steady-state sample analysis configuration.
Figure 6:
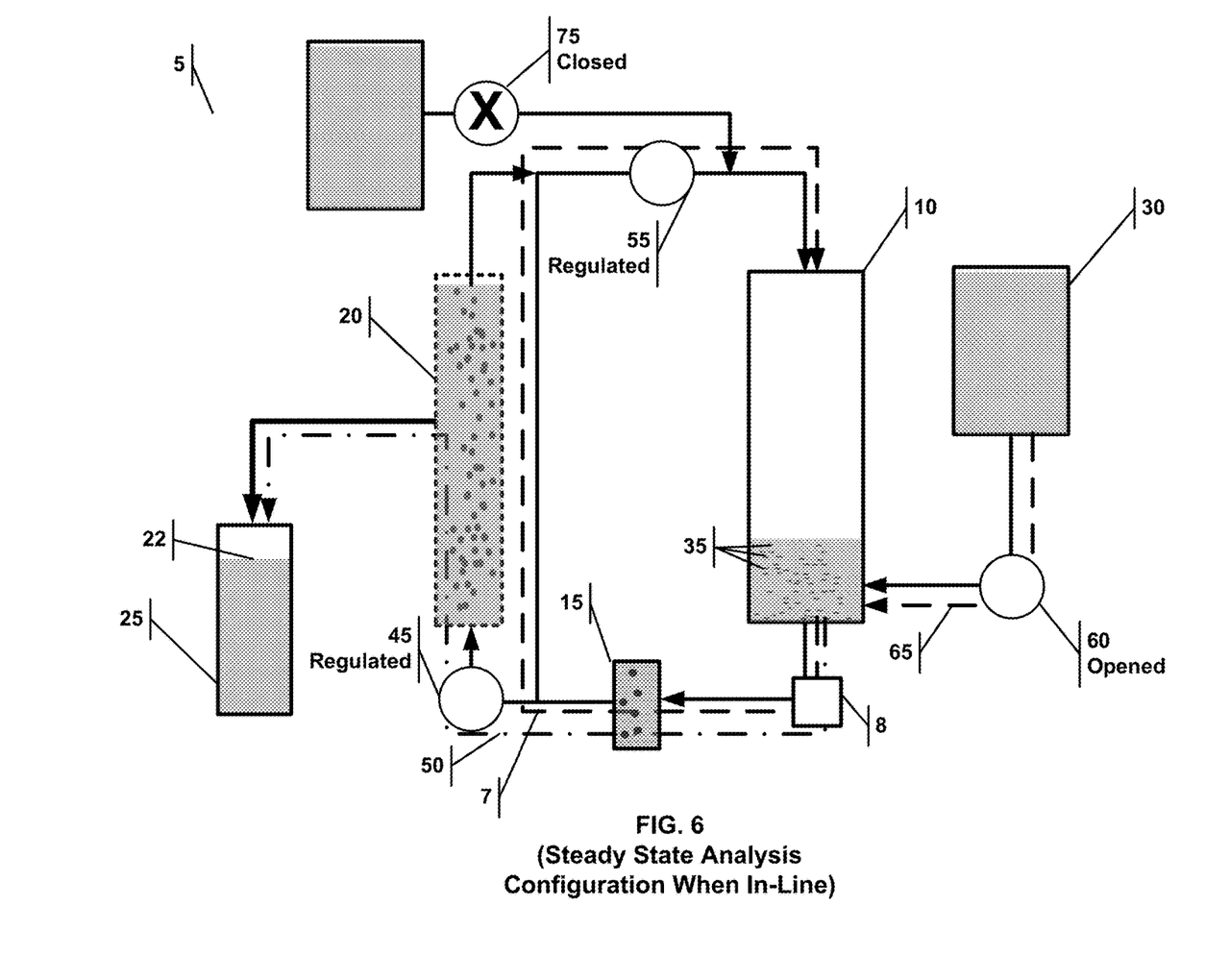
FIG. 6 is a steady-state sample analysis configuration.

After the state in FIG. 4 has been reached, the system 5 may proceed to either a Non-Steady State Analysis (FIG. 5) or a Steady State or In-Line Analysis (FIG. 6). The difference is that in a Non-Steady State Analysis, the permeation membrane valve 45 remains closed, so that as the fluid sample 30 is being introduced, the extent of colloidal dispersion circulating in the colloidal dispersion circuit 7 does not remain fixed. The non-steady state may be used to test a small finite fluid sample.

When the system 5 is used in line with and as part of a larger existing manufacturing system, the changing volume of liquid may affect the reading accuracy of the Raman spectrometer/flow cell 15, so that a steady-state analysis may be desired. In the Steady-State Analysis Configuration shown in FIG. 6, the ultra-filtration membrane permeation valve 45, as well as the reservoir valve 55 (if present), is/are regulated to allow for some of the liquid in the colloidal dispersion to flow out as permeated liquid 22 into the permeated liquid reservoir 25. This is done so that as the fluid sample 30 to be analyzed enters into the reservoir 10, the volume of liquid introduced by the fluid sample valve/ injection port 60 into the system 5 and, more particularly, the colloidal dispersion circuit 7, is approximately the same as the volume of liquid 22 that permeates out of the circuit 7, such that the volume of the total circulating fluid remains unchanged, and the concentration of the LSPR particles 35 remains relatively unchanged for more accurate reading from the Raman spectrometer/flow cell 15.

In either the Non-Steady-State Configuration of FIG. 5 or the Steady-State Configuration of FIG. 6, the processor 37 may perform the steps of: (d) opening the fluid sample injection valve 60 to introduce the fluid sample 30 into the colloidal dispersion circuit 7; (e) reading a second signal from the Raman spectrometer/flow cell 15, wherein the second signal is based on the Raman scattering; and (f) based on the first signal (or any previous signal(s) taken before the fluid sample 30 was introduced) and the second signal, determining the presence and/or the concentrations of contaminants in the fluid sample 30. During step (f), the processor 37 can be configured to identify the quantity or concentration of the contaminant in the fluid sample 30 based on the strength of the second signal from the flow cell 15.

The system 5 may further comprise a database connected to the processor or processors 37, where the database comprises data that relates a plurality of spectra to a plurality of contaminants, and wherein in step (f) the processor 37 is further configured to identify the type of contaminant in the fluid sample 30 based on the database data. Moreover, if the system 5 is analyzing the fluid sample 30 in the Steady State Configuration shown in FIG. 6, the processor 37 regulates the permeation valve 45 to maintain the predetermined colloidal dispersion level, which can be accomplished by maintaining a fixed volume of circulating fluid, as has been discussed.

Figure 7:
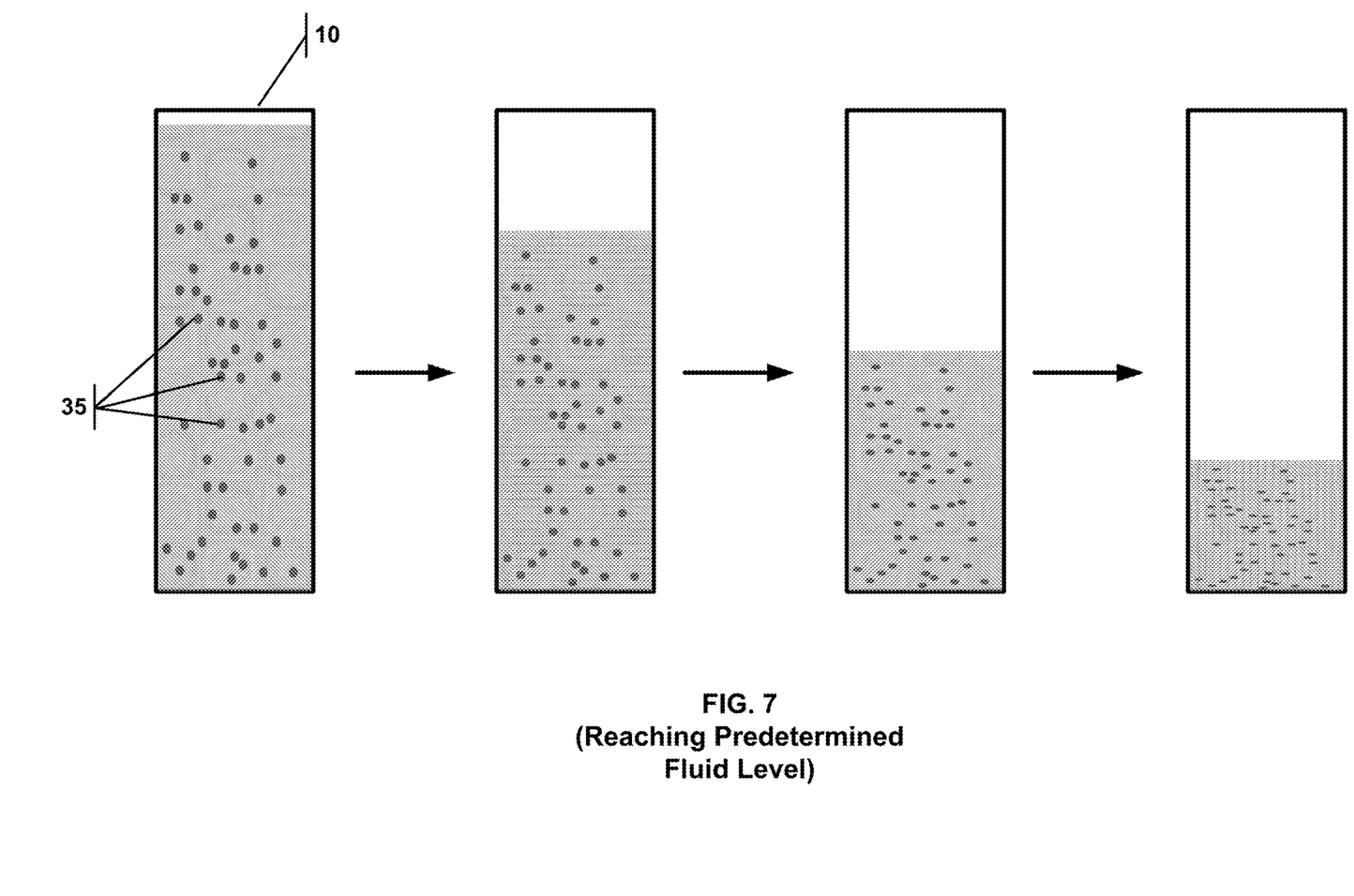
FIG. 7 illustrates the concentration of the colloidal localized plasmon resonance particles through the configuration shown in FIG. 2 through FIG. 4.

FIG. 7 shows the volume of colloidal dispersion in the reservoir 10 (and circulated by the colloidal dispersion circuit 7) decreasing as the system is operated in the configuration of FIG. 3, to reach the predetermined colloidal dispersion level desired (or the predetermined LSPR particle concentration). Note that the concentration of LSPR particles 35 in the colloidal dispersion increases as the volume of the colloidal dispersion decreases. The volume of fluid in circulation and in the reservoir 10 decreases as some of the liquid is permeated through the ultra-filtration membrane 20 into the permeated liquid reservoir 25.

Figure 8:
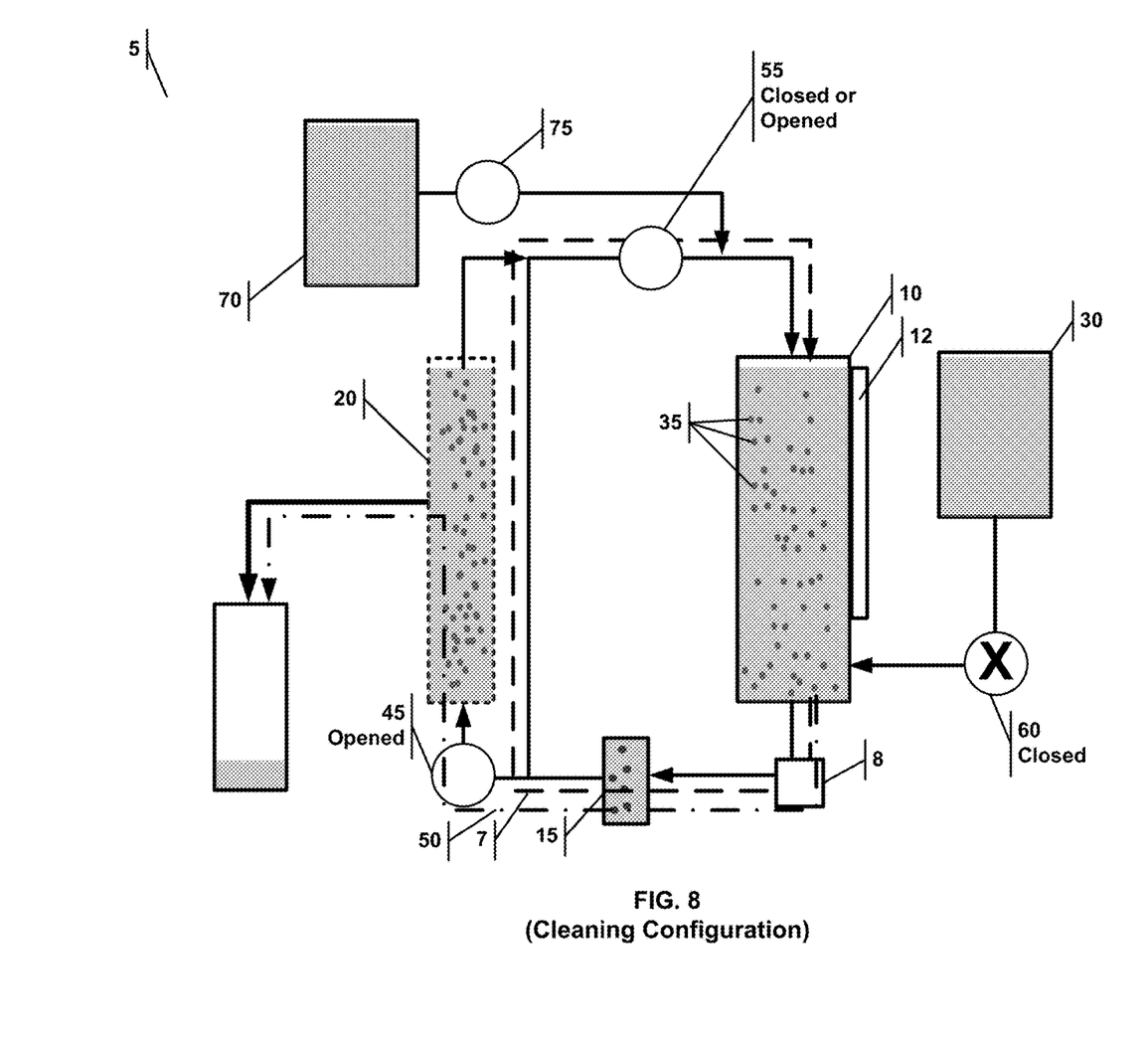
FIG. 8 is the cleaning configuration for the system.

It was mentioned previously that the fluid contaminant detection system 5 may further comprise a cleaning valve 75, which is constructed to introduce a cleaning solution from a cleaning reservoir 70 to the colloidal dispersion circuit 7. FIG. 8 illustrates a Cleaning Configuration for the system 5 to circulate the cleaning solution. The cleaning valve 75 is connected to and operated by the processor 37, and the processor 37 can perform the following steps at some point after step (c): close the fluid sample valve or injection port 60; open the permeation valve 45; and open the cleaning valve 75. Preferably, the cleaning solution can be permeated through the ultra-filtration membrane 20 into the permeated liquid reservoir 25. The cleaning solution may be introduced into the colloid dispersion circuit and permeated out until the contaminants are removed. This may be determined by taking readings from the Raman spectrometer/flow cell 15, and continuing the cleaning process until a baseline Raman signal is reached (i.e., a signal that matches the system 5 Raman signal achieved FIG. 4). If the contaminant is adsorbed, the cleaning solution should be chosen to selectively dissolve, complex, oxidize, reduce, or any combination thereof the contaminant from the LSPR particle surface.

Figure 9:
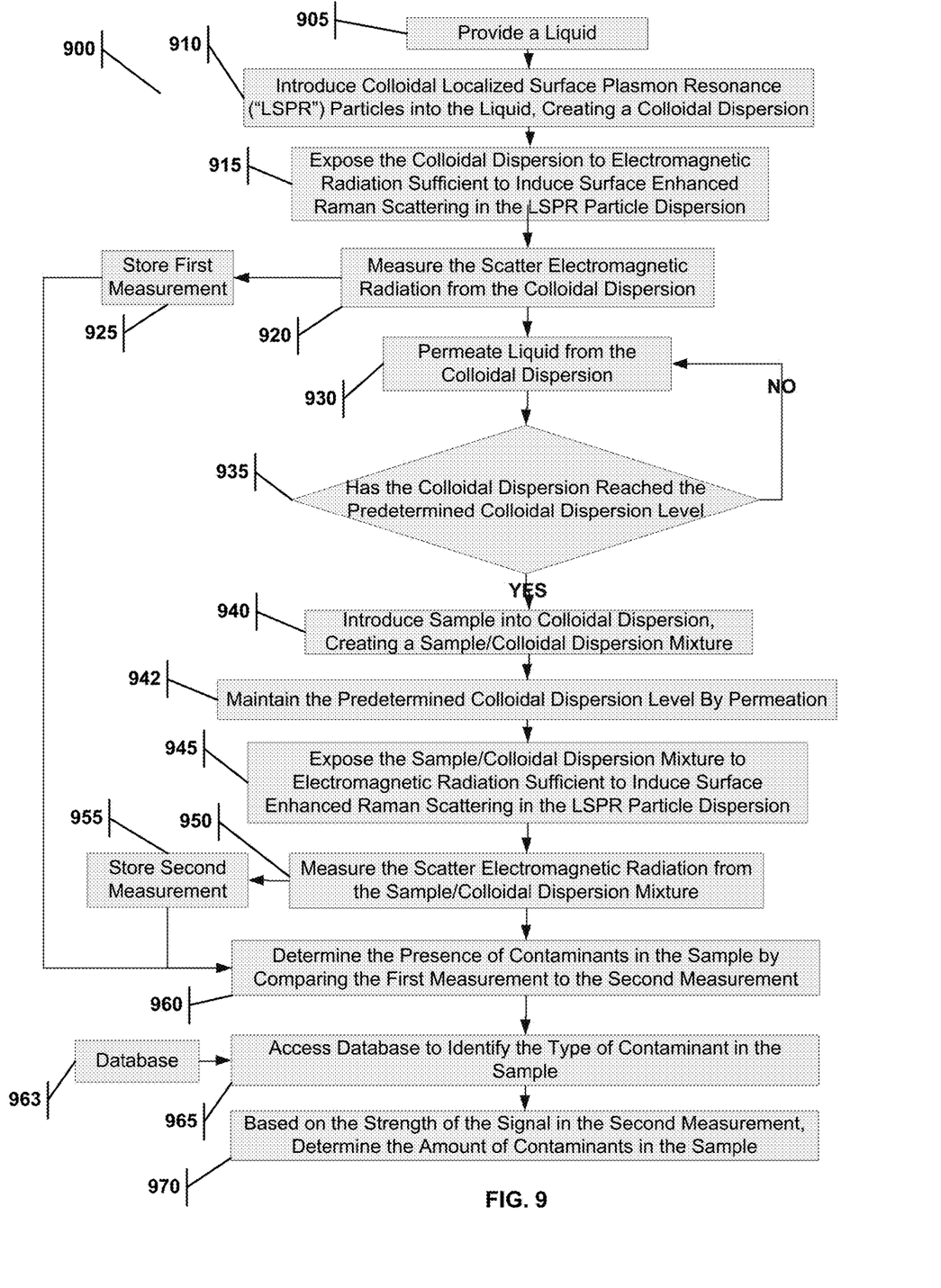
FIG. 9 illustrates a method for detecting contaminants in a sample.

A method of detecting contaminants in a sample 900 is now discussed, which is shown in FIG. 9. The method comprises at a minimum: (a) introducing a colloidal dispersion comprised of a liquid (905) and colloidal LSPR particles (910); (b) exposing the colloidal dispersion with electromagnetic radiation sufficient to induce Surface enhanced Raman scattering in the colloidal dispersion of LSPR particles (915); (c) measuring the scattered electromagnetic radiation from step (b) (920) and storing this as a first measurement (925); (d) introducing the sample to the colloidal dispersion (940); (e) exposing the sample/colloidal dispersion mixture with electromagnetic radiation sufficient to induce Surface enhanced Raman scattering in the colloidal dispersion of LSPR particles (945); (f) measuring the scattered electromagnetic radiation from step (e) (950) and storing this as a second measurement (955); and (g) determining the presence of contaminants in the sample by comparing the measurement from step (c) to the measurement from step (f) (960). After step (a), perhaps prior to step (d), the method may further comprise concentrating the LSPR particles by permeating liquid from the colloidal dispersion (930, 935). Although the steps of permeating liquid from the colloidal dispersion (930) and determining whether the colloidal dispersion reached the predetermined colloidal dispersion level (935) are shown as occurring after exposing the colloidal dispersion to radiation (915) and measuring the scatter electromagnetic radiation from the colloidal dispersion (920), steps (930, 935) may also occur prior to (915, 920) or concurrently with (915, 920).

The method can further comprise, in addition to concentrating the LSPR particles to a predetermined colloidal dispersion level by permeating only the liquid from the colloidal dispersion (930, 935), also permeating the sample/colloidal dispersion mixture to maintain the predetermined colloidal dispersion level (942) during steps (d), (e) and (f). This is analogous to the system configuration in FIG. 6.

The method 900 may further comprise the steps of: (h) comparing the measurements from steps (c) and (f) to a database that comprises data that relates a plurality of spectra to a plurality of contaminants (963); and (i) identifying the type of contaminant based on the comparison in step (h) (965 in FIG. 9). The method 900 may also comprise the step of (j) identifying the concentration or quantity of the contaminant based on the strength of the measurement in step (f) (970 in FIG. 9). A further variation of the method 900 may comprise selecting a filtration membrane from a plurality of membranes, each having a different size of pores and thus permeating a different size of particles, to permeate the liquid from the colloidal dispersion as part of step 930, step 942, or both. Additionally, the method 900 may further comprise circulating a cleaning solution to clean the colloidal dispersion circuit.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend that the following claims "and the embodiments in the specification to be strictly coextensive." Phillips v. AHW Corp., 415 F.3d 1303, 1323 (Fed. Cir. 2005) (en banc).

The invention claimed is:

1. A system for detecting contaminants in a fluid sample comprising:
   a colloidal dispersion circuit comprising:
      a reservoir comprising a colloidal dispersion with localized surface plasmon resonance ("LSPR") particles;
      a Raman spectrometer/flow cell; and
      a pump for circulating the colloidal dispersion through the colloidal dispersion circuit;
   a colloidal dispersion level sensor configured to determine the concentration or extent of colloidal dispersion in the colloidal dispersion circuit;
   a permeation valve constructed to divert the colloidal dispersion in the colloidal dispersion circuit through an ultra-filtration membrane with a pore size smaller than the LSPR particles, thus preventing the LSPR particles from passing through;
   a fluid sample injection valve configured to introduce the fluid sample into the colloidal dispersion circuit; and
   a processor connected to the pump, the Raman spectrometer/flow cell, the permeation valve, the colloidal dispersion level sensor, and the fluid sample injection port, the processor configured to perform the following steps:
      a. activate the pump;
      b. read a first signal from the Raman spectrometer/flow cell, wherein the signal is based on the Raman scattering;
      c. open the permeation valve to divert the colloidal dispersion to the ultra-filtration membrane to reach a predetermined colloidal dispersion level, as indicated by the colloidal dispersion level sensor;
      d. open the fluid sample injection valve to thereby introduce the fluid sample into the colloidal dispersion circuit;
      e. read a second signal from the Raman spectrometer/flow cell, wherein the second signal is based on the Raman scattering;
      f. based on the first signal and the second signal, determine the presence of contaminants in the fluid sample.

2. The system of claim 1, wherein the colloidal dispersion circuit further comprises a reservoir valve between the reservoir and the Raman spectrometer/flow cell, the reservoir valve connected to the processor, and wherein the processor is further configured to open the reservoir valve during step (b).

3. The system of claim 1, wherein after step (c), the processor regulates the permeation valve to maintain the predetermined colloidal dispersion level.

4. The system of claim 1, further comprising a cleaning valve constructed to introduce a cleaning solution from a cleaning solution reservoir to the colloidal dispersion circuit, the cleaning valve connected to the processor, wherein after step (c), the processor:
   closes the fluid sample injection valve;
   opens the permeation valve; and
   opens the cleaning valve.

5. The system of claim 1, further comprising a database connected to the processors, the database comprising data that relates a plurality of spectra to a plurality of contaminants, wherein in step (f), the processor is further configured to identify the type of contaminant based on the database data.

6. The system of claim 5, wherein in step (f), the processor is further configured to identify the quantity of the contaminant based on the strength of the second signal.

7. A method of detecting contaminants in a sample, the method comprising:
   a. introducing a colloidal dispersion comprised of a liquid and colloidal localized surface plasmon resonance ("LSPR") particles;
   b. exposing the colloidal dispersion with electromagnetic radiation sufficient to induce Surface enhanced Raman scattering in the LSPR particles;
   c. measuring the scattered electromagnetic radiation from step (b);
   d. introducing the sample to the colloidal dispersion;
   e. exposing the sample/colloidal dispersion mixture with electromagnetic radiation sufficient to induce Surface enhanced Raman scattering in the colloidal dispersion of LSPR particles;
   f. measuring the scattered electromagnetic radiation from step (e); and
   g. determining the presence of contaminants in the sample by comparing the measurement from step (c) to step (f).

8. The method of claim 7, further comprising the step of: after step (a), concentrating the LSPR particles by permeating liquid from the colloidal dispersion.

9. The method of claim 7, further comprising the steps of:
   after step (a), concentrating the LSPR particles to a predetermined colloidal dispersion level by permeating only the liquid from the colloidal dispersion;
   during steps (d), (e) and (f), permeating the sample/colloidal dispersion mixture to maintain the predetermined colloidal dispersion level.

10. The method of claim 7, further comprising the steps of:
   h. comparing the measurements from steps (c) and (f) to a database that comprises data that relates a plurality of spectra to a plurality of contaminants;
   i. identifying the type of contaminant based on the comparison in step (h).

11. The method of claim 10, further comprising the steps of:
   j. identifying the quantity of the contaminant based on the strength of the measurement in step (f).

12. The method of claim 7, further comprising circulating a cleaning solution to clean the colloidal dispersion circuit.

* * * * *